United States Patent [19]

Cuisin et al.

[11] Patent Number: 4,844,148
[45] Date of Patent: Jul. 4, 1989

[54] CRISTOBALITIC SHELL-MOULD FOR CASTING, THE PRODUCTS AND THE PROCESS USED FOR PREPARING THE SAID MOULD

[75] Inventors: Thierry A. Cuisin, Asnieres; Jean-Noël E. Dody, Rueil Malmaison; Jean-Pierre Flochel, Asnieres, all of France

[73] Assignee: Societe Nationale d'Etude et de Construction de Moteurs d'Aviation "S. N. E. C. M. A.", Paris, France

[21] Appl. No.: 130,224

[22] PCT Filed: Jun. 10, 1987

[86] PCT No.: PCT/FR87/00207
§ 371 Date: Nov. 16, 1987
§ 102(e) Date: Nov. 16, 1987

[87] PCT Pub. No.: WO87/07542
PCT Pub. Date: Dec. 17, 1987

[30] Foreign Application Priority Data

Jun. 10, 1986 [FR] France .................. 86 08337

[51] Int. Cl.⁴ ...................... B22C 1/00; B22C 9/04
[52] U.S. Cl. .................... 164/519; 106/38.3; 106/38.9; 164/361; 164/516; 164/529
[58] Field of Search ........... 164/516, 519, 529, 34, 164/361; 106/38.3, 38.9

[56] References Cited

U.S. PATENT DOCUMENTS

| | | | |
|---|---|---|---|
| 2,211,133 | 8/1940 | Krosta | 164/529 X |
| 3,249,972 | 5/1966 | Watts . | |
| 3,540,519 | 11/1970 | Yates . | |

FOREIGN PATENT DOCUMENTS

| | | | |
|---|---|---|---|
| 1521648 | 3/1968 | France . | |
| 2371257 | 6/1978 | France . | |
| 51-17935 | 6/1976 | Japan | 164/529 |
| 52-17327 | 2/1977 | Japan | 164/529 |
| 58-199639 | 11/1983 | Japan | 164/529 |
| 876288 | 10/1981 | U.S.S.R. | 164/529 |

*Primary Examiner*—Nicholas P. Godici
*Assistant Examiner*—J. Reed Batten, Jr.
*Attorney, Agent, or Firm*—Oblon, Spivak, McClelland, Maier & Neustadt

[57] ABSTRACT

An aqueous bath or slurry for use in forming a shell mould, comprising from 20 to 40 wt. % of colloidal silica, from 20 to 40 wt. % of finely ground zircon, from 15 to 25 wt. % of silica sand, from 15 to 35 wt. % of finely ground fused silica, and from 1 to 5 wt. % of finely ground cristobalite. The shell-mould is made by repeatedly dipping a wax model into the bath or slurry to form a coating of the desired thickness, and then thermally treating the shell-mould so formed by placing the mould into an oven, heating the oven to a temperature between 1050° C. and 1200° C., maintaining the temperature for a period of between 1 and 2 hours, and then allowing the oven and mould to cool to ambient temperature. The mould obtained contains from 10 to 30 wt. % of cristobalite at ambient temperature.

9 Claims, No Drawings

CRISTOBALITIC SHELL-MOULD FOR CASTING, THE PRODUCTS AND THE PROCESS USED FOR PREPARING THE SAID MOULD

The present invention concerns a cristobalitic shell-mould for casting, more particularly for precision casting; it also concerns the products and the process used for preparing the said mould.

When casting certain articles, especially for example articles with controlled solidification, the shell-moulds used are subjected to significant stress in some extremely severe conditions (temperatures, thermal shocks). Now it is known that it is not possible to improve in particular the mechanical properties of these shell-moulds by increasing the thickness of their wall, beyound a thickness of the order of 8 mm, without entailing serious risk of deterioration of the metallurgical qualities of the articles. One has therefore looked to obtain these desired improvements of the mechanical properties by modifying the composition and/or the structure of the material forming the shell-mould.

Among the materials best adapted for forming shell-moulds usable at high temperatures the use of a mixture of silica and zircon has already been described. The process for making shell-moulds with the said material consists of a first step of immersing a wax model in a muc composed of fine particles of refractory material (zircon) in a binder (colloidal silica) and of a second step of applying particles of refractory material on the coating of wet mud thus obtained; these steps are repeated after drying and a shell mould having the desired thickness (4 to 8 mm) is obtained.

There has already been described in another connection casting cores in which there has been introduced, beside the silica blend, finely ground zircon, a silicone resin forming a binder, and possibly a lubricant and a catalyst, from 2.5 to 3.5 % by weight of cristobalite. These casting cores contribute, after having been coated with wax, to the realisation of shell-moulds such as described above. It is clear that the casting cores thus described possess interesting mechanical properties due to the presence of cristobalite, but the problems which are posed for good operation of casting cores are different from those which are posed in the case of shell-moulds.

Finally, there has already been described, for various uses, the process of transformation, at elevated temperatures, of silica into cristobalite under the influence of various mineral catalysts (alkali or alkaline earth salts for example) but it is also known that the said cristobalite takes two crystalline forms, an $\alpha$ form stable at low temperature (below about 250° C.) and a $\alpha$ form stable at high temperature, the said forms having different densities.

Taking all this information into account, the present invention is related to the idea of seeing if it were not possible, with a view to improving their mechanical properties at high temperatures, to make shell-moulds comprising cristobalite. The success of this idea was by no means obvious since the density variations between the two types of cristobalite would risk destroying or weakening the said moulds.

It was found:

on one hand, that in order to benefit from the improvement of the properties not to use a mineral catalyst for silica transformation, (alkali or alkaline earth salts for example) on the other hand, that in order to avoid the harmful effects of the transformations of the $\alpha$ and $\alpha$ forms of cristobalite, it was desirable to control and limit the quantity of cristobalite present in the shell-mould when the latter is subjected to temperature variations in the region where the change in the crystalline form of cristobalite operates.

The present invention therefore firstly concerns an aqueous bath (or a mud) enabling, by the dipping of a wax, the achievement of a coat of material giving rise to a shell-mould, the said bath comprising, by weight, from 20 to 40% of colloidal silica, from 20 to 40% of finely ground zircon, from 15 to 25% of silica sand and being characterized in that it contains from 15 to 35% of finely ground fused silica and from 1 to 5% of finely ground cristobalite.

It is to be remembered that a finely ground material is a material in fine powder form having a granulometry less than 50 thousandths of a millimeter, a sand is a granular material having a mean granulometry between about 0.25 and about 0.50 mm.

In the invention the cristobalite will therefore be used in the form of a flour (granulometry less than 50 thousandths of a mm) but preferably in the form of a fine flour having a granulometry less than about 20 thousandths of a mm.

It will be noted that the bath used comprises neither binder (organic or silicone based) nor catalyst for transforming silica into cristobalite; it is thought that the cristobalite added plays the role of catalyst or seed.

The present invention also concerns a process for making a shell-mould by using a bath according to the invention; the said process consisting of making, according to a known process, a series of dipping - drying of a wax model in a bath according to the invention then thermally treating the precursor obtained in order to increase and control the cristobalite content of the shell-mould; the said thermal treatment being characterised in that the precursor is introduced into an oven which is heated up to a temperature of between 1050° to 1200° C., that the said temperature is maintained for a period of between 1 to 2 hours and that the assembly is then left to cool to ambient temperature.

It will be noted that the period of rising temperature of the oven is of the order of 1 to 2 hours and that the period of cooling is also of the order of 2 hours. When the composition of the shell-mould thus obtained is analysed it is found that it contains, in a uniformly distributed manner, from 10 to 30% by weight of cristobalite; this controlled amount of cristobalite avoids the difficulties at the time of the change in structure of the said cristobalite ($\alpha$ form, $\beta$ form) when the shell-mould is subjected to rapid similar changes of temperature.

The invention thus concerns shell-moulds characterised in that they contain from 10 to 30% by weight of cristobalite.

The moulds according to the invention, having a dimensional stability and notable mechanical properties, can be used for all casting, especially precision casting, up to temperatures of about 1600° C. It will be noted that when the metal (or alloy) melt is poured into the said shell-mould the structure of the material constituting the mould becomes modified; it is thus, for example, that at a temperature of 1500° C. all of the silica present in the said mould will be transformed rapidly (in a period of a few minutes) into cristobalite, which will confer the mould with optimum properties. If there has been used compounds such as catalysts, or various additives, there would then have been formed, beside the crystals of cristobalite, vitreous portions which would have weakened the properties of the mould; one of the characteristics of the shell-moulds according to the invention is that, heated to elevated temperature, they give rise to moulds in which at least 95% of the silica present is transformed into cristobalite.

The following non-limiting examples illustrate the invention.

EXAMPLE 1

There were made aqueous muds (slurries) containing 24% by weight of colloidal silica, 16.7% of silica sand, 3.5% of finely ground cristobalite and varying proportions of finely ground zircon and finely ground fused silica.

There were dipped several times in these various muds a wax and there were thus obtained shell-moulds with a thickness of about 6 mm.

The dry shell-moulds were introduced into an oven of which the temperature was progressively increased to 1150° C.; the total of time for the temperature rise was 1 hour 30 minutes; this temperature was then maintained at 1150° C. for 1 hour after which the oven was gradually cooled to ambient temperature, the duration of this cooling being about 2 hours.

It was found that in these conditions there were obtained shell-moulds of which the content of α-cristobalite (measured at ambient temperature) was about 20%.

Test pieces taken from shell-moulds usable in this form were subjected, in order to test them, to a heating to 1500° C. for periods varying from 3 to 15 minutes. There was measured the deformity obtained making use of a deformation test under constant stress at 1500° C. (test derived from the determination of the standard of bending rupture, three points at elevated temperature described in the standard PRER 18 of 1970 revised in 1978).

The results obtained are represented in the following table:

| Test No. | Composition of the slurry | | Deformity (per thousand) at t = 10 minutes after heating periods of | | |
|---|---|---|---|---|---|
| | Finely ground zircon % | Finely ground fused silica % | 3 mins. | 10 mins. | 15 mins. |
| | | | (constant stress of 0.5 MPa). | | |
| 1 | 38 | 17.8 | 3.25 | 2.25 | 1.75 |
| 2 | 35.5 | 20.3 | 2.75 | 2 | 1.50 |
| 3 | 33 | 22.8 | 2.25 | 1.75 | 1.20 |
| 4 | 30.5 | 25.3 | 2 | 1.50 | 1.1 |
| 5 | 28 | 27.8 | 1.75 | 1.50 | 1 |
| 6 | 25.5 | 30.3 | 1.6 | 1.50 | 1 |

These results show that at the temperature of 1500° C. there is established a rapid improvement of the mechanical properties of the shell-moulds when the heating period increases from 3 to 15 minutes; this result is due, and this has been confirmed by crystallographic measurement, to an increase, as the heating period increases, of the cristobalite content of the material; the results obtained show that for the moulds of tests 4, 5 and 6 and a heating period of 15 minutes at 1500° C. the transformation into cristobalite of the silica contained in the shell-mould is almost total and greater than about 95% (and preferably of the order of 98%).

We claim:

1. An aqueous bath or slurry for coating a material on wax giving rise to a shell-mould, said bath or slurry comprising:
   20–40 wt.% of colloidal silica;
   20–40 wt.% of finely ground zircon;
   15–25 wt.% of silica sand;
   15–35 wt.% of finely ground fused silica; and
   1–5 wt.% of finely ground cristobalite.

2. The aqueous bath or slurry of claim 1, wherein said finely ground fused silica, said finely ground zircon and said finely ground cristobalite have a granulometry of less than 50 thousandths of a millimeter.

3. The aqueous bath or slurry of claim 1, wherein said silica sand has a mean granulometry between about 0.25 and about 0.50 mm.

4. The aqueous bath or slurry of claim 1, wherein said finely ground cristobalite has a granulometry less than about 20 thousandths of a millimeter.

5. A process for making a shell mould, comprising the steps of:
   (1) making a mould precursor by repetitively dipping-drying a wax model in the aqueous bath or slurry of claim 1;
   (2) thermally treating said mould precusor by introducing said mould precursor into an oven which is heated to a temperature of between 1050°–1200° C. and maintaining said temperature for a period of between 1 and 2 hours to make a shell mould; and
   (3) cooling said shell mould to ambient temperature.

6. A shell-mould obtained according to the process of claim 5, wherein said shell-mould contains from 10 to 30% by weight of cristobalite.

7. A process for casting, comprising:
   pouring a metal or alloy melt into the shell-mould of claim 6 at a temperature sufficient for at least 95% of the silica present in said shell mould to be transformed into cristobalite.

8. The process of claim 7, wherein said temperature is about 1600° C.

9. The process of claim 7, wherein said temperature is about 1500° C.

* * * * *

UNITED STATES PATENT AND TRADEMARK OFFICE
CERTIFICATE OF CORRECTION

PATENT NO. : 4,844,148
DATED : July 4, 1989
INVENTOR(S) : Cuisin et al

It is certified that error appears in the above-identified patent and that said Letters Patent is hereby corrected as shown below:

Column 1, line 28: delete "muc", insert -- mud --;
line 32, delete "shell mould", insert -- shell-mould --;
line 40, delete "realisation", insert -- realization --;
line 53, delete " $\alpha$ ", insert -- $\beta$ --.

Column 1, line 66: add, after "properties", -- derived from cristobalite, it was advisable --.

Column 2, line 2: delete "of the $\alpha$ and $\alpha$ forms", insert -- of the $\alpha$ and $\beta$ forms --.

Column 4, lines 32, 41, 42 and 49: delete "shell mould", and replace with -- shell-mould --.

Signed and Sealed this

Twelfth Day of June, 1990

*Attest:*

HARRY F. MANBECK, JR.

*Attesting Officer*   *Commissioner of Patents and Trademarks*